United States Patent
Ravindran et al.

(10) Patent No.: US 10,594,602 B2
(45) Date of Patent: Mar. 17, 2020

(54) WEB SERVICES ACROSS VIRTUAL ROUTING AND FORWARDING

(71) Applicant: HEWLETT PACKARD ENTERPRISE DEVELOPMENT LP, Houston, TX (US)

(72) Inventors: Hari Babu Ravindran, Roseville, CA (US); David Rodrigues Pinheiro, Santa Clara, CA (US); Roman Nersisyan, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/024,752

(22) Filed: Jun. 30, 2018

(65) Prior Publication Data

US 2020/0007442 A1     Jan. 2, 2020

(51) Int. Cl.
*G06F 15/173* (2006.01)
*H04L 12/713* (2013.01)
(Continued)

(52) U.S. Cl.
CPC ........ *H04L 45/586* (2013.01); *H04L 61/2007* (2013.01); *H04L 67/28* (2013.01);
(Continued)

(58) Field of Classification Search
CPC ... H04L 45/586; H04L 67/28; H04L 61/2007; H04L 61/6013; H04L 45/74; H04L 45/42
(Continued)

(56) References Cited

U.S. PATENT DOCUMENTS

| 8,719,344 B2 * | 5/2014 | Kelkar ............... H04L 61/6013 709/203 |
| 2006/0013209 A1 * | 1/2006 | Somasundaram .. H04L 12/4675 370/389 |

(Continued)

OTHER PUBLICATIONS

Reverse Proxy Access From Wan?, Reddit, Retrieved on Jun. 6, 2018, 9 Pgs. https://www.reddit.com/r/homelab/comments/2t6oh7/reverse_proxy_access_from_wan/.
(Continued)

*Primary Examiner* — Liang Che A Wang
*Assistant Examiner* — Johnny B Aguiar
(74) *Attorney, Agent, or Firm* — Nolte Intellectual Propery Law Group

(57) ABSTRACT

Disclosed is a method, system, and computer readable medium to provide an implementation to provide proxy style support for multiple virtual routing and forwarding (VRF) instances on a single network communication device. The proxy style support includes instantiating a plurality of pairs of namespaces and instances of a Unix service, each of the plurality of pairs representing a pair to support a single instance of a VRF. The network communication device may receive a network request associated with a network address mapped to a first VRF from a client device. The network request may be proxied from the pair of namespace/service supporting the first VRF to a backend single instance of a proxy server. Communication across independent namespaces may be supported by using a local communication mechanism (e.g., Unix sockets, Winsock) to provide support for the multiple VRFs concurrently.

14 Claims, 10 Drawing Sheets

(51) Int. Cl.
  *H04L 29/12* (2006.01)
  *H04L 29/08* (2006.01)
  *H04L 12/741* (2013.01)
  *H04L 12/717* (2013.01)

(52) U.S. Cl.
  CPC .............. *H04L 45/42* (2013.01); *H04L 45/74* (2013.01); *H04L 61/6013* (2013.01)

(58) Field of Classification Search
  USPC ................................ 709/219, 238, 244, 245
  See application file for complete search history.

(56) References Cited

U.S. PATENT DOCUMENTS

| | | | | |
|---|---|---|---|---|
| 2013/0159409 | A1* | 6/2013 | Kelkar | H04L 61/2015 709/204 |
| 2016/0088022 | A1* | 3/2016 | Handa | G06F 16/957 726/1 |
| 2018/0006935 | A1* | 1/2018 | Mutnuru | H04L 45/306 |
| 2019/0014040 | A1* | 1/2019 | Yerrapureddy | H04L 12/28 |

OTHER PUBLICATIONS

Reverse Proxy to Multiple Internal HTTP Servers Behind a Single HTTPS VIP, Retrieved on Jun. 6, 2018, 7 Pgs. https://discussions.citrix.com/topic/392621-reverse-proxy-to-multiple-internal-http-servers-behind-a-single-https-vip/.

Reverse Proxy with Unix Domain Socket, Retrieved on Jun. 6, 2018, 2 Pgs. https://www.hiawatha-webserver.org/forum/topic/2625.

Ahern, D., "net: VRF support," Feb. 4, 2015, https://lwn.net/Articles/632522/.

Iazz, "nginx-vrf-ext ingx_http_vrf_ext_module.c," GitHub, https://github.com/jazz/nginx-vrf-ext/blob/master/ngx_http_vrf_ext_module.c.

* cited by examiner

WEB SERVICES ACROSS VIRTUAL ROUTING AND FORWARDING

BACKGROUND

In the field of network communication and network administration, devices dispersed throughout one or more networks may provide connectivity across different networks and network segments (e.g., subnets, intranets, or the Internet). The practice of directing traffic across and through different portions of interconnected networks to that traffic's appropriate destination (e.g., device associated with correct destination address) is referred to as "routing." The function of routing is normally performed by a network communication device called a "router." As explained in more detail below, internal to a router is information maintained in routing tables that assist in directing traffic, in part, by transmitting that traffic through an appropriate network interface of the router so that it proceeds on its journey toward the appropriate destination address (and therefore device associated with that destination address). There are many routers that connect many different networks and subnets and each of them may perform an important function for the portions of the networks they serve. From a network administration perspective, maintenance of a vast number of unique routers may present a challenge.

In Internet Protocol (IP) based computer networks, virtual routing and forwarding (VRF) refers to a technology that allows multiple instances of a routing table to co-exist within the same network communication device (e.g., router) at the same time. In some cases, network functionality may be improved because network paths can be segmented without requiring multiple routers. A VRF may be implemented in a network device by distinct routing tables known as forwarding information bases (FIBs) that are discussed in more detail below. There is typically one FIB per routing instance. Alternatively, a network device may have the ability to configure different virtual routers, where each one has its own FIB that is not accessible to any other virtual router instance on the same network communication device.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
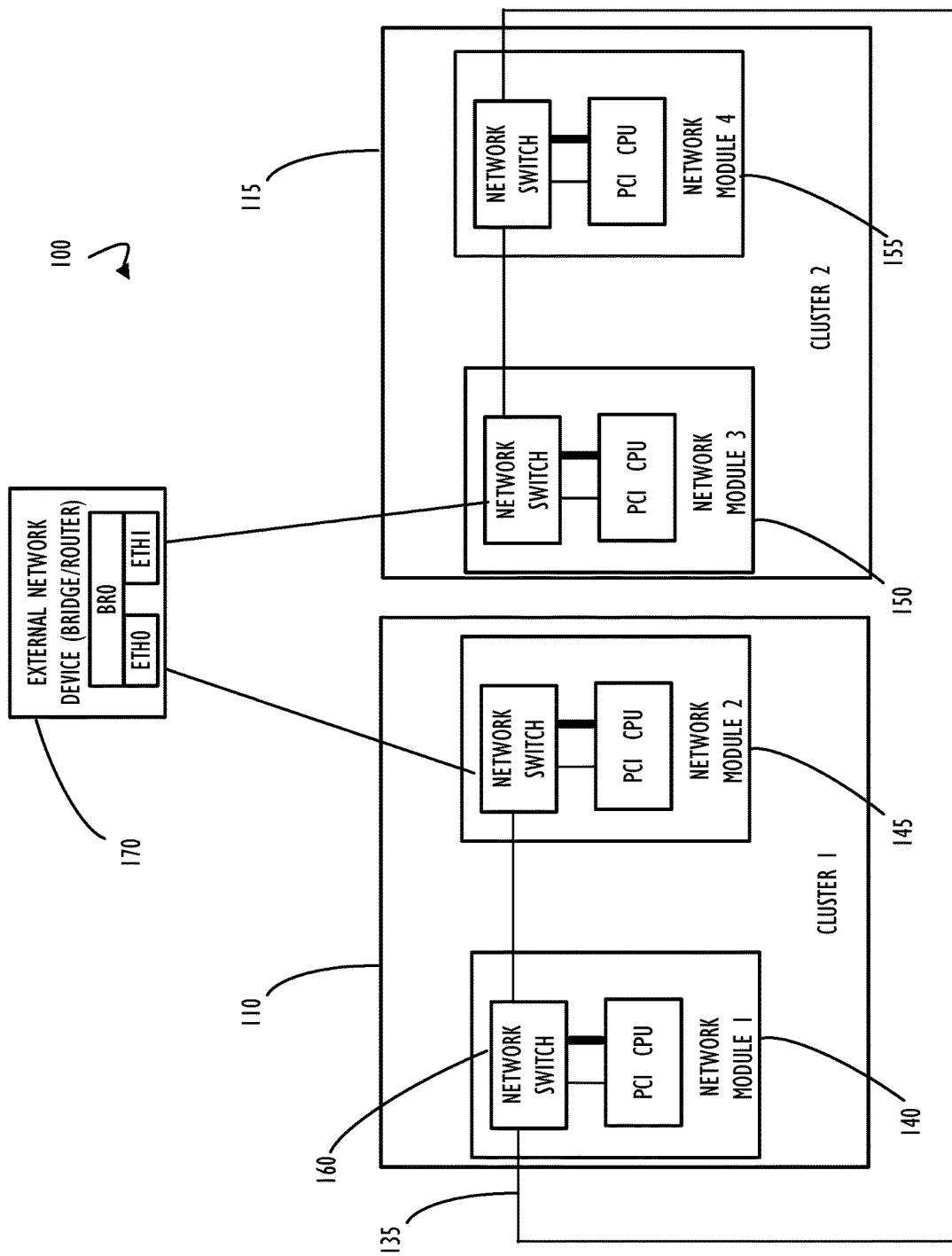
FIG. 1 is a functional block diagram representing an example of different network communication devices including a bridge/router and two network switches for each of two independent frames (or similarly configured blade resources), according to one or more disclosed implementations.

Examples of the subject matter claimed below will now be disclosed and then a specific non-limiting implementation will be explained with reference to the FIGs. In the interest of clarity, not all features of an actual implementation are described in every example of this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In the field of network computing, network connectivity between devices, compute nodes, blades, or frames of a scaleable compute resource may be implemented using a network communication device. Network communication devices, such as switches, routers, hubs, bridges, etc. represent a primary communication path for sharing data between different types of compute resources generically referred to as "nodes" of a network. The shared data may represent inputs to compute processes (e.g., data or applications), outputs of compute resources (e.g., compute results), communications to coordinate distributed processes, communications between users, and other types of data. In any "intelligent" network communication device there may be a processor, local memory, configuration information, and "current state" information, among other types of information. Collectively, the different types of information on a network device may be considered to represent the overall "device state" at a given point in time. For example, information on a network communication device (including its "device state") is expected to change over time, in part, because while in-service and providing active communication paths for a network, the overall configuration and available devices on that network may change. In particular, routing information may change as devices become available and go away at different points in the overall network (e.g., a laptop device relocating). Information in routing tables and overall network connectivity may represent a portion of the device state of a network communication device.

In general, a switch may be thought of as a device in a computer network that connects together other devices ("nodes" of the network). Multiple data cables may be plugged into a switch to enable communication between different networked devices. Switches manage the flow of data across a network by transmitting a received network packet only to the one or more devices for which the packet is intended. Each networked device connected to a switch can be identified by its network address, allowing the switch to direct the flow of traffic, possibly in an effort to maximize the security and efficiency of the network. A switch is more intelligent than a hub (e.g., Ethernet hub), which simply retransmits packets out of every port of the hub except the port on which the packet was received. In most cases, a hub is unable to distinguish different recipients, and therefore may have an overall lower network efficiency, but simpler configuration information, than a switch/router. Generally, a router is a networking device that forwards data packets between computer networks. Routers perform the traffic directing functions on the Internet. A data packet is typically forwarded from one router to another router through the networks that constitute an internetwork until it reaches its destination node.

As explained further below, some network communication devices are "hybrid" devices in that they perform more than one classification of service. That is some switches may also be routers and some routers may also be switches and have hubs as part of their architecture. Accordingly, there are a variety of network communication devices (commonly referred to as switches, hubs, routers, etc.) that may benefit from the concepts of this disclosure. Other examples of network communication devices that may also benefit include, but are not limited to: wireless access points, remote access servers, bridges, brouters, etc. Also, some network communication devices do not fit into a single classification and may be hybrids of two classes of devices (e.g., a brouter is a bridge-router hybrid). In general, this disclosure represents an improvement to the art of network computing by providing enhanced VRF capability that may be used to improve performance, security, and reliability of a network (e.g., a corporate infrastructure network).

To address implementations of an embedded processing environment of a network communication device participating in a VRF solution, resource constraints and ease of configuration may play a role in how many physical devices configured as routers must be supported by an organization. Using the disclosed VRF management techniques the total number of physical router devices and unique administration requirements of each VRF may be reduced. This is, in part, because more routers (e.g., virtual routers) may be supported on less devices and by "cloning" a portion of the configuration of each VRF less unique administration may need to be performed. Accordingly, disclosed implementations represent an improvement to the art of network management, in part, by introducing VRF management techniques that may be used to provide a plurality of VRFs on a single routing device with reduced administration and configuration requirements. This is accomplished, in part, by utilizing a "clone" of a service (e.g., a copy that is almost identical to the original) to support a proxy function for the original service that was cloned. In one example implementation, a plurality of instances of NGINX may be instantiated with a unique and local namespace to provide a VRF capability and proxy server function for one or more IP addresses supported by the network communication device (e.g., router).

NGINX is an open source reverse proxy server for applications/operating system. In one implementation NGINX is used to provide a service for the multiple VRFs supported on a single network communication device. NGINX is only an example of an implementation of that support service and other implementations are also possible. In general, there may be many reverse proxy servers that may perform functions identified in this disclosure as being performed by NGINX and thus a replacement to another reverse proxy server is possible without departing from the scope of this disclosure.

For some network administration functions to be able to access and support capabilities of a switch, there may need to be instances of servers (e.g., web servers) configured to provide access to an administration graphical user interface (GUI) of the switch. In one example implementation, ArubaOS-CX may provide the operating system for the operating environment of the network communication device (e.g., switch) and an instance of NGINX may execute to expose corresponding ports for network communications. These ports may be used by remote client devices with the instance of the NGINX redirecting all http(s)/web sockets requests to the backend web servers. For example, in ArubaOS-CX based switches, such as Aruba 8400 and 8320, there may be multi VRF support. Accordingly, there may be a desire to have HTTPS access to the switch via multiple VRFs at the same time. The multiple VRFs in ArubaOS-CX may be implemented, in part, by using the Linux network namespaces. Linux is an example of a Unix based operating system (OS). ArubaOS-CX is used as an example OS and other operating systems may have similar capabilities to support a network communication device with multiple VRF support. Accordingly, many network communication devices that support multiple VRFs concurrently may benefit from the disclosed VRF management techniques.

Continuing with the example implementation based on ArubaOS-CX, there is a module named 'hpe-restd" that acts as the "real" backend server. In one example implementation, the traffic and access for different VRFs concurrently executing on the network communication device may be facilitated by this single backend server rather than having to execute and maintain multiple distinct instances of a backend server (e.g., one for each VRF). In this example implementation, there may be a one-to-one mapping of VRFs to a Linux namespace (that is unique to the VRF). Each of these Linux namespaces may have its own Transport Control Protocol/Internet Protocol (TCP/IP) stack (e.g., to support network communications independent of any other concurrently running VRF on the same machine/interface).

As a result, networks may be detached separately for each VRF on a single Linux machine.

In Linux, direct communication between namespaces (e.g., the network VRF namespaces of this disclosure) is not possible. However, different namespaces within Linux may have communication established through sockets. Sockets are an internal communication support mechanism provided by Unix based operating systems. The details of sockets are beyond the scope of this disclosure. For the purposes of this disclosure consider sockets as representing a communication channel where some processes executing on the machine may send information and other processes executing on the machine may listen for information. Thus, the two processes within the same operating system instance (i.e., a Linux OS instance) may communicate with each other.

NGINX supports both listening on a Unix socket as well proxying to a Unix socket. In one example implementation of disclosed multiple VRF management techniques, a template of systemd service file (a Unix service file) may be created which receives the namespace name (e.g., name associated with a single VRF instance) and starts the NGINX instance on that network namespace. Accordingly, there is a "clone" of the system service to address the process of instantiating an additional instance of NGINX for each dynamically created VRF as part of the VRF: namespace pair creation. For example, the command to start the VRF NGINX is 'systemctl start inbound_nginx_vrf@<NS>.service', where 'NS' is the Linux network namespace. In response to this command, one NGINX for Linux network namespace instance is started as a service for the switch. That is, a service dedicated to this newly created VRF on the switch. For the NGINX server to be stopped for the network namespace, the command 'systemctl stop inbound_nginx_vrf@<NS>.service' may be used, where 'NS' represents the Linux network namespace (e.g., associated with the VRF being taken down).

NGINX may be enabled by default to listen on the Unix socket (in this context "listen" means communication by either reading or writing information to the socket) designated to share information across VRF namespaces. In addition to the NGINX instance associated with each supported VRF, the single backend NGINX instance may be started as another service. The backend server (hpe-restd) may also be used to map or control each of the Linux network namespaces associated with a VRF to the single NGINX service and to start and stop the inbound_nginx_vrf@<NS> services as needed. The lifecycle of a network request starts when the request is sent over the network namespace <IP:port>. That is, there is a network request made to send a network message to an IP:port combination where the IP address of the destination may be correlated to an IP address supported by one of the VRFs of a network communication device. Upon receipt at the VRF (e.g., the namespace/VRF NGINX instance executing on the network communication device), the request may be proxied to the single backend NGINX instance listening on the Unix socket. In turn, the internal single backend NGINX proxies the request on behalf of the VRF instance to the back-end web server. Details of the lifecycle briefly summarized here are discussed in more detail below with reference to FIGS. 3-6. As a result, multi VRF HTTPS access to a network device (and the system administration GUI application for each VRF) running Arabas-CX may be provided. This includes support for dynamically created VRFs. Further, there is only a requirement for a single backend server (hpe-restd) instance running on the switch and the rest of the connections are proxied by using multiple instances of NGINX being proxied (with the help of Unix socket communication) through a single NGINX instance associated with the single backend server.

Having an understanding of the above overview, this disclosure will now explain a non-limiting but detailed example implementation. This example implementation is explained with reference to the figures and includes: different example devices that may benefit from the above multiple VRF management techniques (FIGS. 1-2); a specific example device implementation (FIG. 3); an example functional process flow for processing and proxying network messages (FIG. 4); an example method for adding a VRF to a network communication device (FIG. 5); an example method for proxying network message (FIG. 6); an example VRF management method (FIG. 7); an example processor and computer-readable medium to implement the example VRF management method (FIG. 8); an example system of a network of computers where network communication devices supporting multiple VRFs may be implemented (FIG. 9); and an example processing device that may be used in one or more devices that may implement the disclosed VRF management techniques or on devices set up to support those devices (FIG. 10).

Referring now to FIG. 1, computer infrastructure 100 illustrates a set of computer devices, each containing at least one network communication device. In this example, network module 1 (140) through network module 4 (155) represent a network communication device that may be part of a larger device. In this case, the larger device may be a hyperconverged node of a cluster or possibly a frame of a scaleable compute resource. Also, in this example, network device 170 illustrates a stand-alone network device such as a bridge or a router. In the context of this disclosure, a network communication device may exist independently or be part of a larger system and still have a limited amount of embedded resources that may benefit from the disclosed event ingestion management technique.

In computer infrastructure 100, network communication device 170 has a primary function of providing connectivity between independent network frames or possibly independent clusters of compute resources (e.g., cluster 1 110 and cluster 2 115). Note, in the example of FIG. 1, the links between cluster compute resources Cluster 1 (110) and Cluster 2 (115) (specifically between Network Module 2 (145) and Network Module 3 (150)) do not represent a direct connection because they pass through network communication device 170. Cluster 1 (110) and Cluster 2 (115) may be thought of as independent but related cluster resources.

For example, Cluster 2 (115) may be configured as a "hot backup" to Cluster 1 (110). Communication path 135 may provide communication directly between Cluster 1 (110) and Cluster 2 (115) to support exchange of role information and heartbeat information as appropriate. Further, in this scenario, an external network communication device 170, such as bridge/router, has been inserted to form a communication path between distinct compute resources and possibly provide additional communication to other devices (not shown) and networks (not shown). Accordingly, the configuration of external network device 170 may, at some point, require support for multiple VRFS and the VRF management techniques of this disclosure may assist in that effort.

As illustrated in FIG. 1, a computer infrastructure 100 may include a plurality of different types of network devices (e.g., switch, router, bridge, etc.) that may all benefit from the disclosed techniques of event ingestion management. Accordingly, examples of this disclosure are not limited to any particular type of network connectivity device and may be applicable to any network communication device that maintains VRF routing when performing its function. In the example of FIG. 1, network devices that may implement VRF routing include each instance of network switch 160 and external network device 170. A device with a strict hardware only coupling (i.e., a hardware Hub), where no processing takes place, may not be a candidate for VRF routing, because there may be no local "processing" possible. However, any device that maintains internal adjustable routing configuration information may be considered to be a candidate for multiple VRF support and corresponding processing may take place in accordance with this disclosure.

Figure 2:
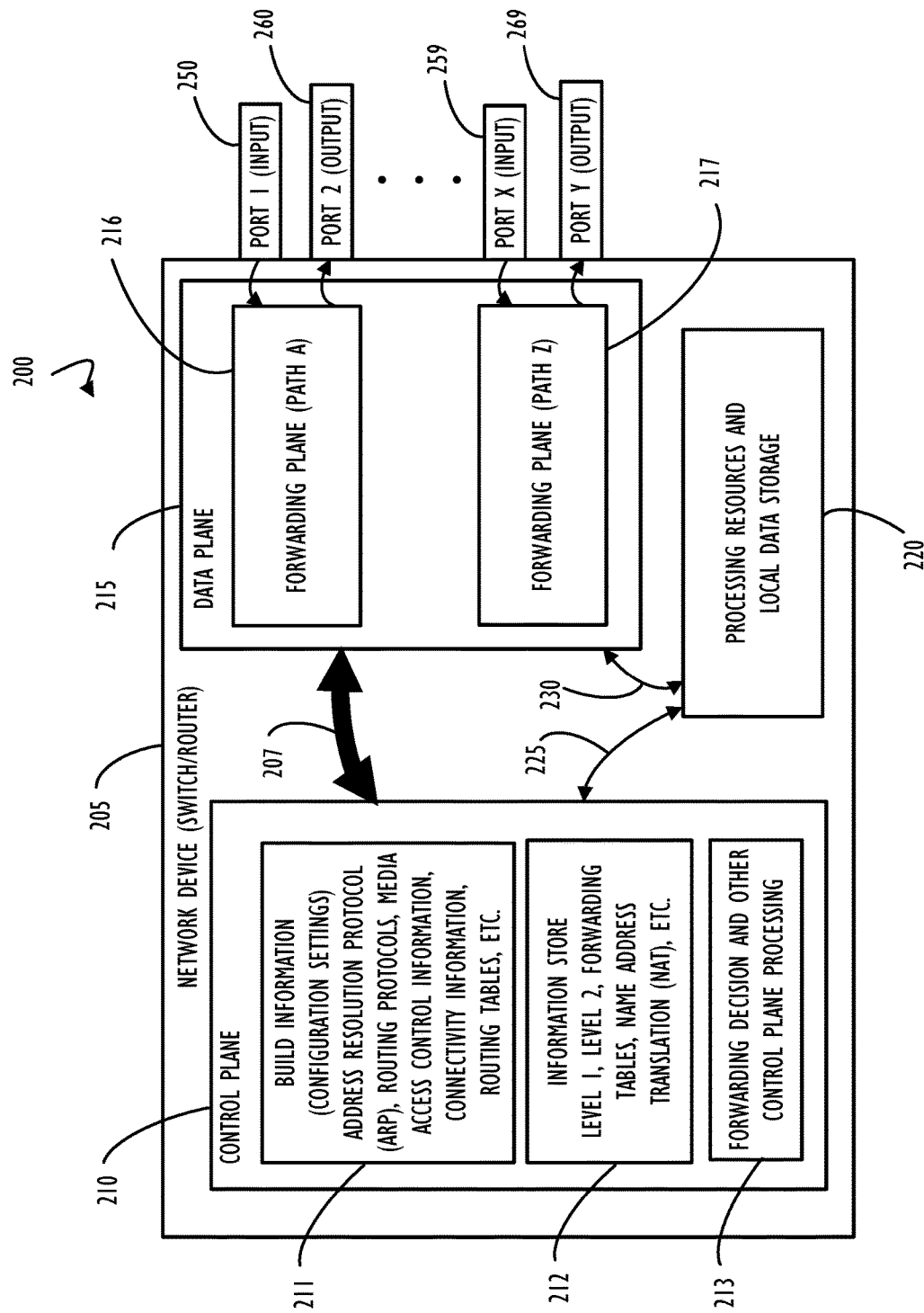
FIG. 2 is a functional block diagram representing a first example of a network communication device and possible functional components (logical and physical) of the network communication device, according to one or more disclosed implementations.

Referring now to FIG. 2, a network communication device such as a switch/router 205 is illustrated in block diagram 200. In general, a router has two types of network element components organized onto separate planes illustrated as control plane 210 and data plane 215 in block diagram 200. In addition, a typical switch/router 205 may include processing resources and local data storage 220 that may include local processing and configuration metrics for the network device. Depending on the capabilities of a particular network device different types of processing resources and local storage may be present. In general, higher capacity network device implementations will include substantial processing resources and memory while simpler (e.g., low capacity) devices will contain less internal resources. In any case, as mentioned above, processing resources for a network communication device are typically provisioned based on a planned network need and may not have much unused capacity for other functions (e.g., monitoring). However, in some cases network communication devices with additional capacity may be used to implement multiple VRF support and defer or eliminate a need for an organization to purchase and implement additional routers.

Control plane 210, for example in a router such as switch/router 205 may be used to maintains routing tables (or a single comprehensive routing table) that list which route should be used to forward a data packet, and through which physical interface connection (e.g., output ports 260 through 269). Control plane 210 may perform this function by using internal preconfigured directives, called static routes, or by learning routes dynamically using a routing protocol. Static and dynamic routes may be stored in one or more of the routing tables. Static routes are typically preconfigured and may be considered as one or many possible network device database settings for possible monitoring. Thus, a change to an existing route or an addition of a route may trigger an event that requires ingestion by the monitoring system. The control-plane logic may strip non-essential directives from the table and build a forwarding information base (FIB) to be used by data plane 215. Recall that there may be an independent FIB for each instance of a VRF because each instance of a VRF represents an independent instance of a router (logically speaking) on a single network communication device (e.g., switch/router 205).

A router may also use a forwarding plane (e.g., part of the data plane 215) that contains different forwarding paths for information from different ports or different destination addresses (e.g., forwarding path A 216 or forwarding path Z 217). In general, The router forwards data packets between incoming (e.g., ports 250-259) and outgoing interface connections (e.g., ports 260-259). The router forwards data packets to the correct network type using information that the packet header contains matched to entries in the FIB supplied by control plane 210. In some networks implementations, a router (e.g., switch/router 205) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 2, bidirectional arrow 207 indicates that control plane 210 and data plane 215 may work in a coordinated fashion to achieve the overall capabilities of a network device such as switch/router 205. Similarly, bidirectional arrow 225 indicates that processing and local data storage resources 220 may interface with control plane 210 to provide processing and storage support for capabilities assigned to control plane 210. Bidirectional arrow 230 indicates that processing and local data storage resources 220 may also interface with data plane 215 as necessary.

Control plane 210 as illustrated in FIG. 2 includes several example functional control blocks. Additional control blocks are possible depending on the capabilities of a particular implementation of switch/router 205. Further, control blocks may be replicated for each instance of a VRF/namespace implemented on a single network communication device. Block 211 indicates that control plane 210 may have associated build information regarding a software version of control code that is currently executing on switch/router 205. In addition, that software version may include configuration settings to determine how switch/router 205 and its associated control code perform different functions. Many different configuration settings for both the software and the device itself are possible and describing each is beyond the scope of this disclosure. However, the disclosed VRF management techniques may be designed to replicate some of these configuration settings and other communication control information as necessary to support the independence of each VRF/namespace pair instantiated on a single network communication device. Block 211 further indicates that different types of routing information and connectivity information (e.g., on a per VRF basis or possibly globally) may be known to switch/router 205 and control plane 210. Block 212 indicates that an information store may be accessible from control plane 210 and include forwarding tables or NAT information as appropriate. Block 213 indicates that control plane 210 may also be aware of forwarding decisions and other processing information. Although FIG. 2 illustrates these logical capabilities within control plane 210 they may actually be implemented outside of, but accessible to, control plane 210.

Capability to OSI Level Example Mapping

Capabilities of different types of network devices (one example of which is switch/router 205) that may benefit from the disclosed VRF management capabilities may vary greatly. Capabilities of different network devices are generally described with respect to how those capabilities map to the OSI model. A brief overview of the different layers and their typical capability mapping is provided in the next few paragraphs to provide context for this disclosure. However, no particular OSI mapping capability is required to practice the concepts of this disclosure and this information should not be considered limiting in any way. These are just sample devices that may benefit from the VRF management techniques and examples of types of network functionality that may be performed by devices incorporating disclosed techniques.

An Ethernet hub is an example of a simple layer 1 network device (in contrast to a switch that operates at layer 2 and router that operates at layer 3). An Ethernet hub does not manage any of the traffic coming through it. Any packet entering a port may be repeated to the output of every other port except for the port of entry. Specifically, each bit or symbol may be repeated as it flows in. Accordingly, VRF support may not be applicable to a device that only performs the function of an Ethernet Hub.

A layer 2 switch operating as a network bridge may interconnect devices in a home or office for example. The bridge may learn the MAC address of each connected device. Bridges may also buffer an incoming packet and adapt the transmission speed to that of the outgoing port. While there are specialized applications, such as storage area networks, where the input and output interfaces are the same bandwidth, this is not always the case in general LAN applications. Generally, in LANs, a switch may be used for end user access and typically concentrates lower bandwidth and uplinks into a higher bandwidth. Interconnect between switches may be regulated using spanning tree protocol (STP) that disables links so that the resulting local area network is a tree without loops. In contrast to routers, spanning tree bridges have topologies with only one active path between two points. Shortest path bridging is a layer 2 alternative to STP that allows all paths to be active with multiple equal cost paths. Information about the topologies and other information learned by a given network device represent examples of data that may be reflected in routing tables of that device.

A layer-3 switch can perform some or all of the functions normally performed by a router. In some cases, network switches are limited to supporting a single type of physical network, typically Ethernet, whereas a router may support different kinds of physical networks on different ports. As mentioned above, many combination (e.g., hybrid) devices are possible and can perform a variety of functions such that they do not fit neatly into a single category of device. Regardless, of the overall capabilities of the device, the disclosed multiple VRF management technique may be applicable for the device if that device can support VRF routing in general.

A common layer-3 capability is awareness of IP multicast through IGMP snooping. With this awareness, a layer-3 switch may increase efficiency by delivering the traffic of a multicast group only to ports where the attached device has signaled that it wants to listen to that group. Layer-3 switches typically support IP routing between VLANs configured on the switch. Some layer-3 switches support the routing protocols that routers use to exchange information about routes between networks.

While the exact meaning of the term layer-4 switch is vendor-dependent, a layer-4 switch almost always includes a capability for network address translation (NAT) and may add some type of load distribution based on Transmission Control Protocol (TCP) sessions or advanced Quality of Service (QoS) capabilities. Further, network devices may include a stateful firewall, a VPN concentrator, or be an IPSec security gateway.

Layer-7 switches may distribute the load based on uniform resource locators (URLs), or by using some installation-specific technique to recognize application-level transactions. A layer-7 switch may include a web cache and participate in a content delivery network (CDN).

Figure 3:
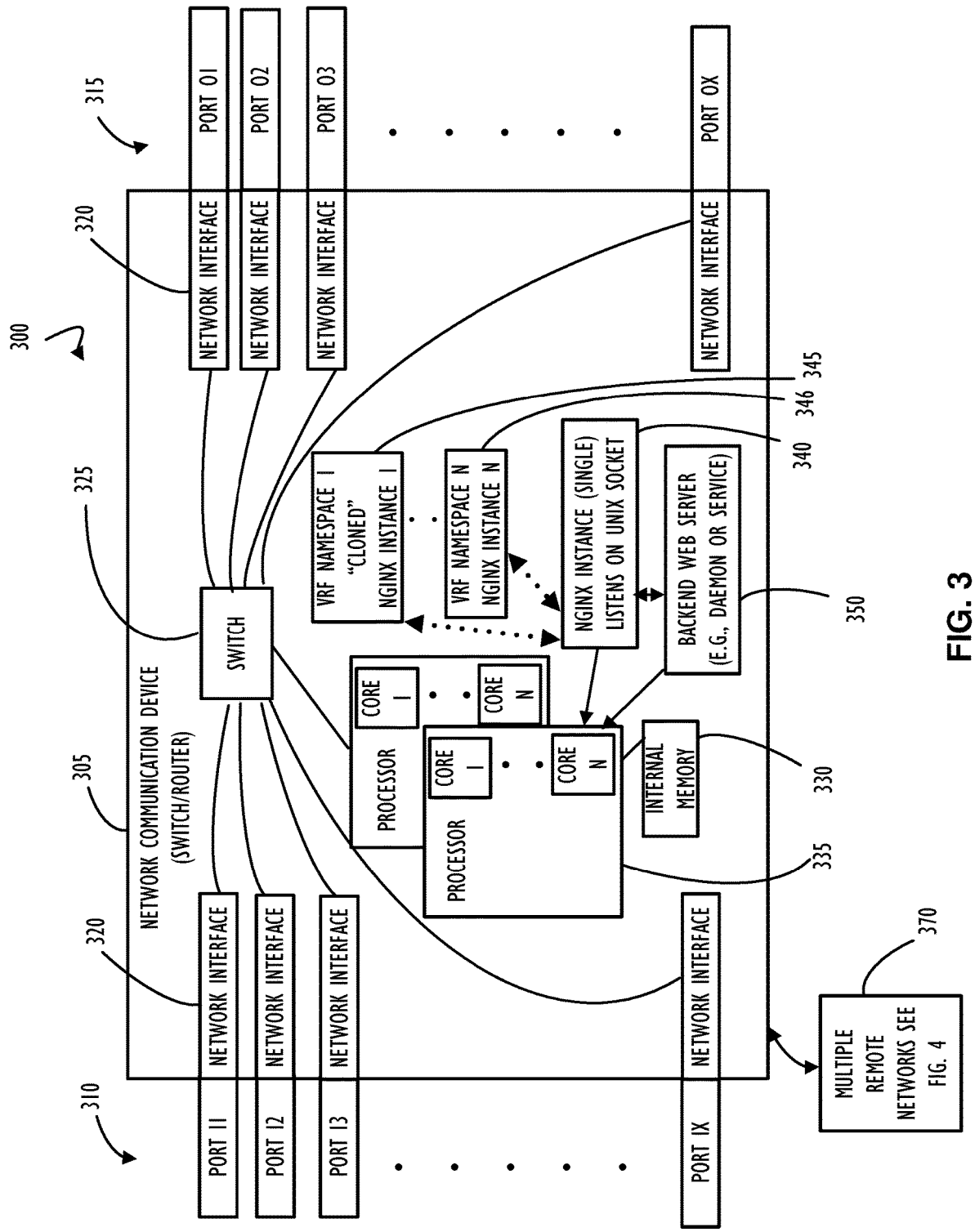
FIG. 3 is a block diagram representing a second example of a network communication device including a plurality of VRF namespace/service instance pairs and a single service instance (e.g., NGINX instance) to facilitate proxy connections for a plurality of VRFs on a single network communication device, according to one or more disclosed implementations.

Referring now to FIG. 3, a simplified network communication device 305 such as a switch/router is illustrated in block diagram 300. In general, a network communication device 305 may include an internal switch 325 that communicatively connects a set of input/output ports 310 via a logical or physical network interface 320 to a set of input/output ports 315 that also have an associated logical or physical network interface 320. The communication paths established by switch 325 may be controlled by one or more processors 335 (and possibly corresponding hardware logic) and the processors 335 may obtain and store information in internal memory 330. Each of the one or more processors 335 may include any number of cores as indicated by CORE 1 through CORE N of processors 335.

Network device 305 represents a relatively basic switch or router architecture. In addition to standard components, network device 305 is illustrated to include a backend web server 350, a "single" NGINX instance 340 (e.g., the backend instance) that may serve to proxy network messages from a plurality of VRF/namespace instances (e.g., VRF namespace 1 (345) through VRF namespace N (346)). Each of these VRF/namespace instances may have an associated (and dedicated) NGINIX instance that communicates back to the "single" independent NGINIX instance 340. In this manner NGINIX instance 340 may act as a proxy for communication between a VRF/namespace instance and the backend web server instance 350

Also shown in FIG. 3, is a box to represent multiple remote networks 37 that represent sources of incoming network messages and destinations for outgoing messages processed by network communication device 305. In general, a message may be received at network communication device 305 and be associated with a specific remote network. That remote network may further be associated with a particular VRF supported on network communication device 305. Recall, that for each supported VRF on network communication device 305 there is a corresponding VRF namespace/NGINX instance. Accordingly, once a network message is received at network communication device 305 it may be obtained by the appropriate service (e.g., VRF namespace/NGINX instance) for processing. Once obtained, if that request is destined for backend web server 350, for example, the request may be proxied through single NGINIX instance 340 using Unix socket-based communication to the backend web server 350. In this manner, each supported VRF may communicate to the backend web server 350 via a proxy connection. Similarly, responses from backend web server 350 may be communicated through the proxy or may simply be sent directly out as a network message to the appropriate client device that initiated the network request message. Implementation specifics may be determined based on security requirements of an organization or other factors including security of protocols used for network communication. For example, it may not be proper for the response to be provided in a manner such that it cannot be guaranteed to come from an appropriate device.

Figure 4:
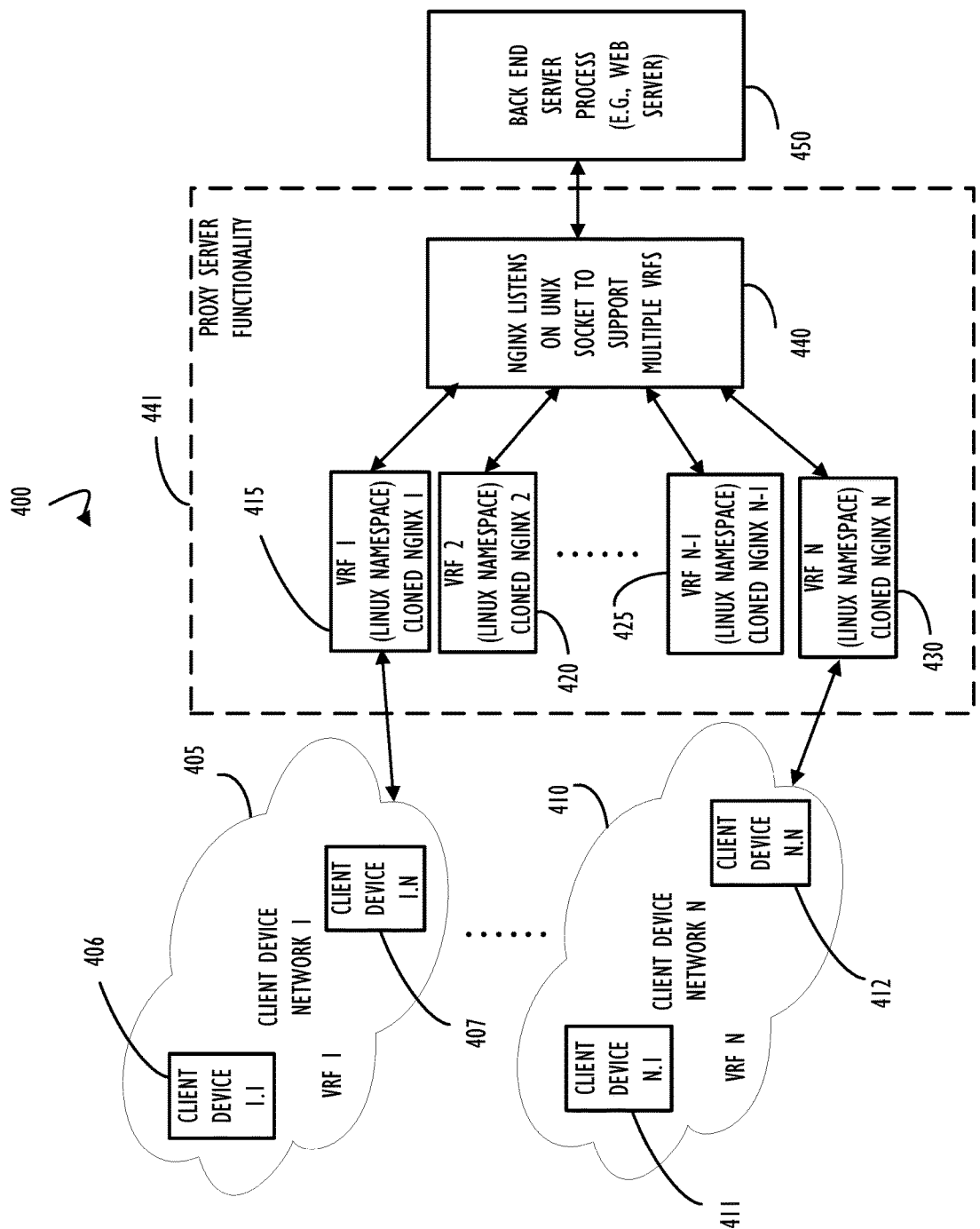
FIG. 4 is a block diagram representing details of one example network configuration and proxy server functionality that may be implemented on a network communication device, according to one or more disclosed implementations.

Referring to FIG. 4, functional block diagram 400 illustrates one possible set of networks and a proxy server functionality implemented, in part, based on multi-VRF support, according to disclosed embodiments. Functional block diagram 400 includes multiple client device networks such as client device network 1 (405) and client device network N (410). As indicated by the ellipses between each of these networks, any number of client device networks are possible. In client device network 1 (405) there are represented two client devices (again any number are possible) client device 1.1 (406) and client device 1.N (407). Each of the devices in client device network 1 (405) is further associated with a single VRF network indicated as VRF 1. That is, the network represented by devices in client device network 1 may have IP addresses within the range corresponding to that being further associated with VRF 1 on a network communication device (not shown). Similarly, the network represented by devices (e.g., client device N.1 (411) and client device N.N (412)) in client device network N (410) may have IP address within the range corresponding to the range supported by VRF N on the network communication device.

Block 441 (represented by a dashed outline in FIG. 4) indicates that a proxy server functionality may exist. For example, the VRF management technique of this disclosure providing a proxy capability for multiple VRFs on a single network device. Inside block 441 are several functional blocks that may be implemented on a single machine such as a single network communication device. Block 441 is illustrated as a dashed line in this example to indicate that proxy server functionality may not always be provided by a single device and multiple devices may be involved in this process. However, some of the disclosed VRF management techniques rely on local device communication (e.g., Unix sockets) and therefore, when implementation specifics that require local communication are utilized, some functional components are required to be on a common device. Details of this distinction are implementation specific.

Continuing with FIG. 4, VRF 1 415 represents a VRF/namespace pair and corresponding NGINX instance to support network addresses associated with that VRF. VRF 2 420 represents a VRF/namespace pair and corresponding NGINX instance to support network addresses associated with that VRF, likewise for VRF N−1 425 and VRF N 430. Block 440 represents the above-mentioned single backend NGINX instance that provides a proxy style connection for communication between each of the VRFs and the backend server process 450. Backend server process 450 may be a web server or be a web service providing functionality to network requests. In general, a request from a remote device may arrive at its appropriate VRF and be proxied to (and through) NGINX instance 440 to backend server process 450. Thus, network requests from client device 1.1 406 would be processed at VRF 1 415 and then proxied by NGINX instance 440 to backend server 450.

Figure 5:
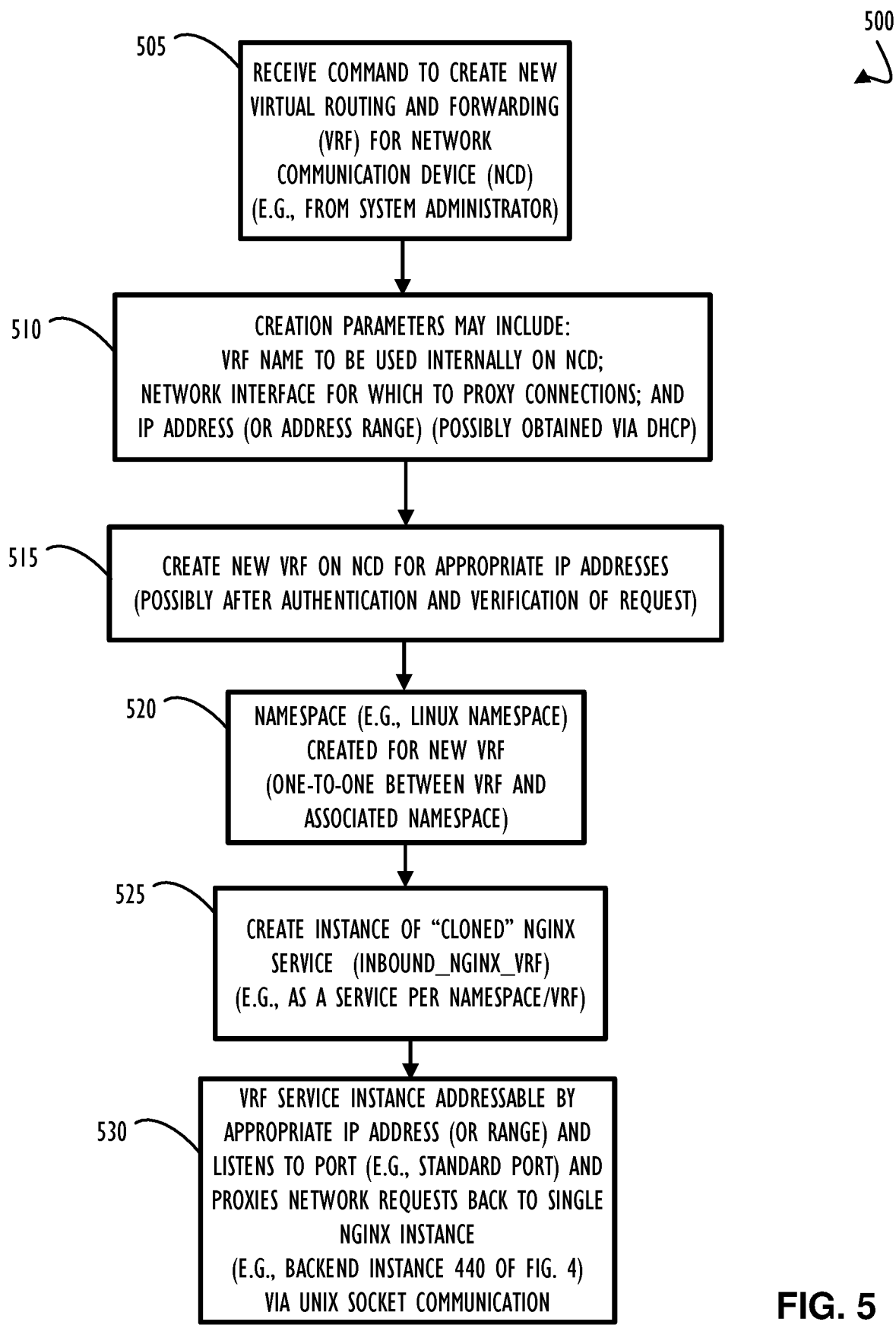
FIG. 5 is an example flowchart illustrating VRF creation, and corresponding proxy server servicing of the VRF, as might be performed using the disclosed namespace/service instance pairs for each VRF according to one or more disclosed implementations.

Referring to FIG. 5, there is shown a flow diagram depicting one example process 500 for instantiating a VRF/namespace and corresponding NGINX instance to support a VRF as one of multiple VRFs on a single network communication device, according to one or more disclosed implementations. Process 500 begins at block 505 where a request to create a new VRF is received. For example, a system administrator may issue a command on a network communication device to instantiate support for a new VRF instance. Block 510 indicates that creation parameters for the new VRF may include a name to be used internally to control (e.g., startup or shutdown) the VRF may be provided (e.g., as part of the creation command). Also included in this definitional command may be the network interface for which this new VRF will be associated and an IP address, set of addresses, or range of addresses that are associated with this VRF. Block 515 indicates that the new VRF may be created on the network communication device in response to the received command and that there may be an authentication requirement (e.g., with respect to security) and validation requirement (e.g., with respect to properness of command arguments) performed. Block 520 indicates that a namespace such as a Linux namespace may be created for the new VRF and that there may be a one-to-one correspondence between the VRF and the associated namespace. Block 525 indicates that an instance of a "cloned" NGINX service (e.g., INBOUND_NGINX_VRF as discussed above) may be created and there may be a service per VRF supported on the single network communication device. Block 530 indicates that the VRF service instance (i.e., newly created VRF) may be addressable by the IP address information provided in the creation command and listen to ports on appropriate interfaces of the network communication device such that the VRF service instance can utilize the single NGINX instance as a proxy for communication to/from a backend web server instance (e.g., as illustrated in FIG. 4). Finally, block 530 further indicates that communication from each VRF specific NGINX instance to the single NGINX instance may be implemented using Unix socket communication.

Figure 6:
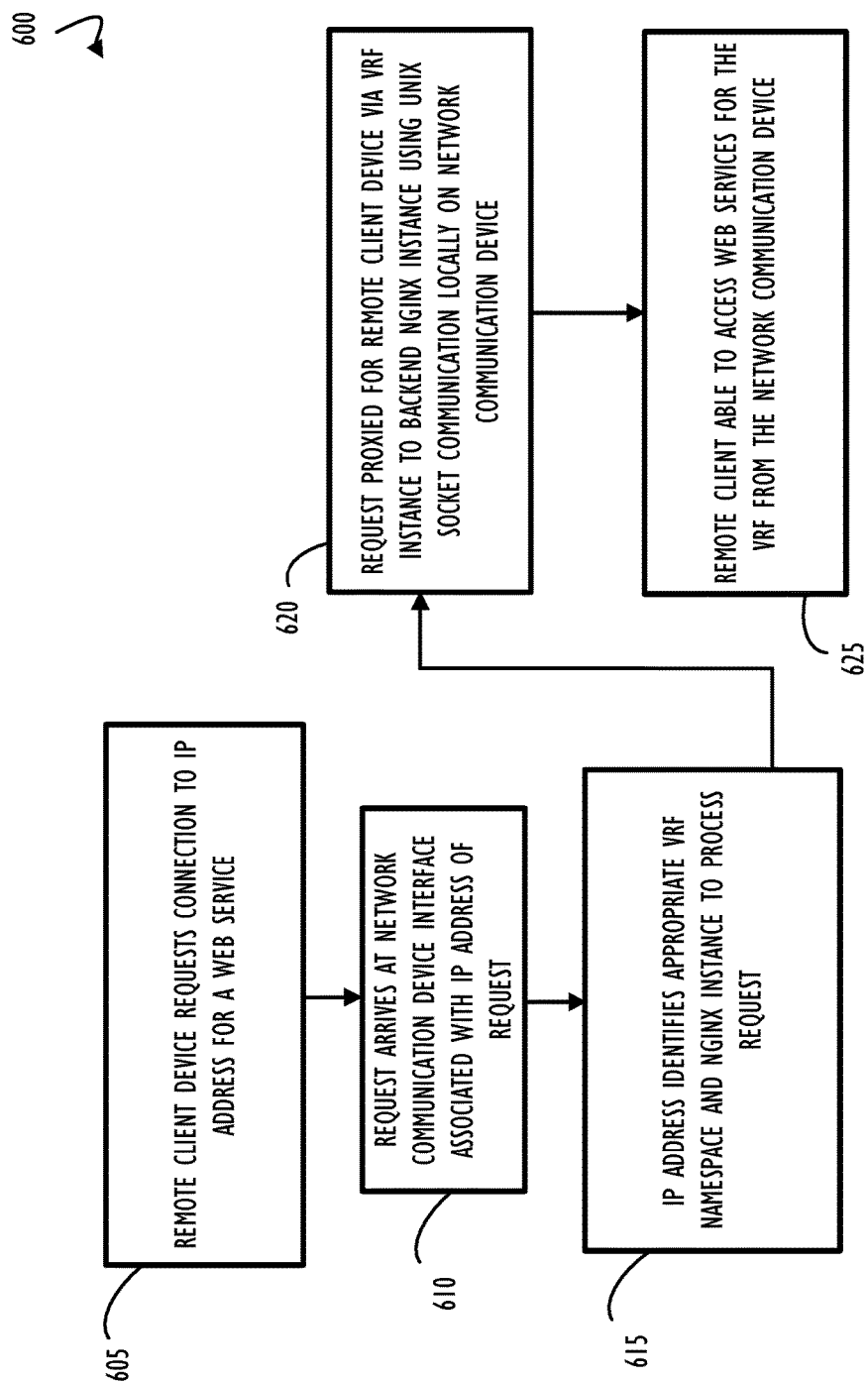
FIG. 6 is an example flowchart illustrating a servicing and directing of a remote client network request to that request's intended destination device (or process on a device), according to one or more disclosed implementations.

Referring to FIG. 6, there is shown a flow diagram illustrating method 600 for performing a communication exchange between a remote client device and a web service (e.g., a web server providing responses to network message requests). Method 600 begins at block 605 where a remote client device (e.g., client device 1.1 406 of FIG. 4) requests a connection to an IP address for a web service. For example, the connection request may be an HTTPS request to connect to a system administration GUI of a VRF being supported on a network communication device or an HTTP request for a web page from a web server (e.g., web server of backend server process 450 of FIG. 4). Block 610 indicates that the request arrives at the network communication device (e.g., a network communication device configured to support multiple VRFs) at a device interface associated with the IP address of the destination of the request (e.g., the web server IP address) and the source IP address (e.g., IP address of the requesting client) is also known. Block 615 indicates that either or both of these IP addresses may be used to identify the appropriate VRF namespace and NGINX server instance to process the inbound request (e.g., the INBOUND_NGINX_VRF). Block 620 indicates that the request is proxied for the remote client device through the single backend NGINX instance (e.g., NGINX instance 340 of FIG. 3) using Unix socket communication. Block 625 indicates that the remote clients are able to access the web services for the desired VRF (of the plurality of concurrently executing VRFs) from the network communication device by using the disclosed VRF management techniques for a single network communication device.

Figure 7:
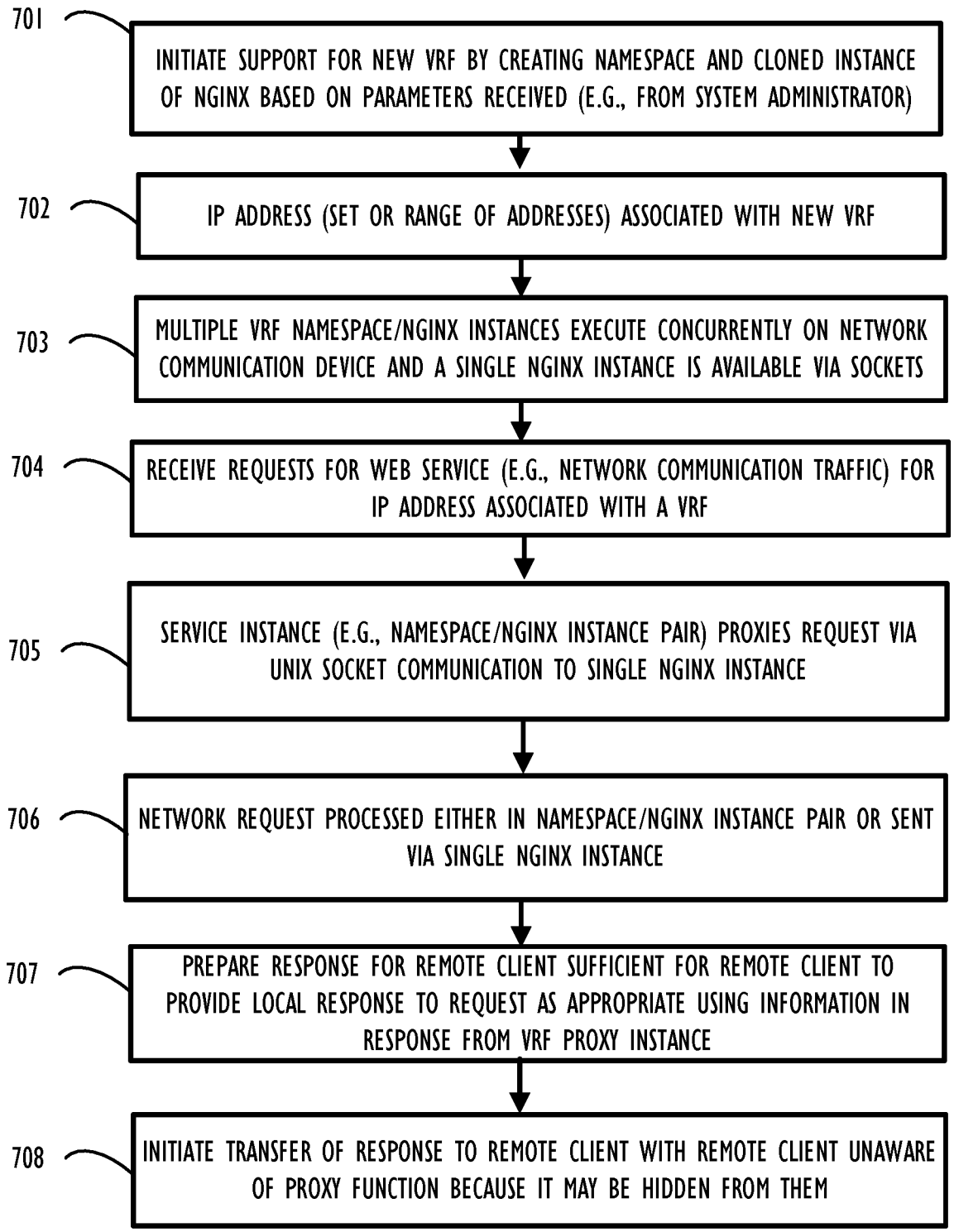
FIG. 7 is an example method that may be performed within a computer network environment on one or more network communication devices to perform VRF management techniques, according to one or more disclosed implementations.

FIG. 7 illustrates an example method 700 that may be used to perform VRF management techniques on a network communication device, according to one or more disclosed embodiments. Example method 700 begins at block 701 where support for a new VRF may be initiated based on a received command. Block 702 indicates that the new VRF may be associated with one or more IP addresses. Block 703 indicates that multiple VRF/namespace NGINX instances may concurrently execute on a network communication device and a single NGINX instance may proxy for each of them using Unix sockets. Block 704 indicates that requests for web services may be received at an IP address associated with a VRF. Block 705 indicates that a service instance (e.g., a namespace/NGINX service instance pair) may proxy the request as described above. Block 706 indicates that the network request may be processed via the single NGINX instance. Block 707 indicates that a response to the request may be prepared for the remote client. The response may sufficient for the client device to complete a local action that is responsive to the initial network request. For example, if the client requested a web page the information for presentation of the web page is provided in the response. Block 708 indicates that the prepared response may be transferred to the remote client. In some cases, the remote client may be unaware of the proxy functions being used to service their requests because it may be hidden from that client and the client may not require that information.

Figure 8:
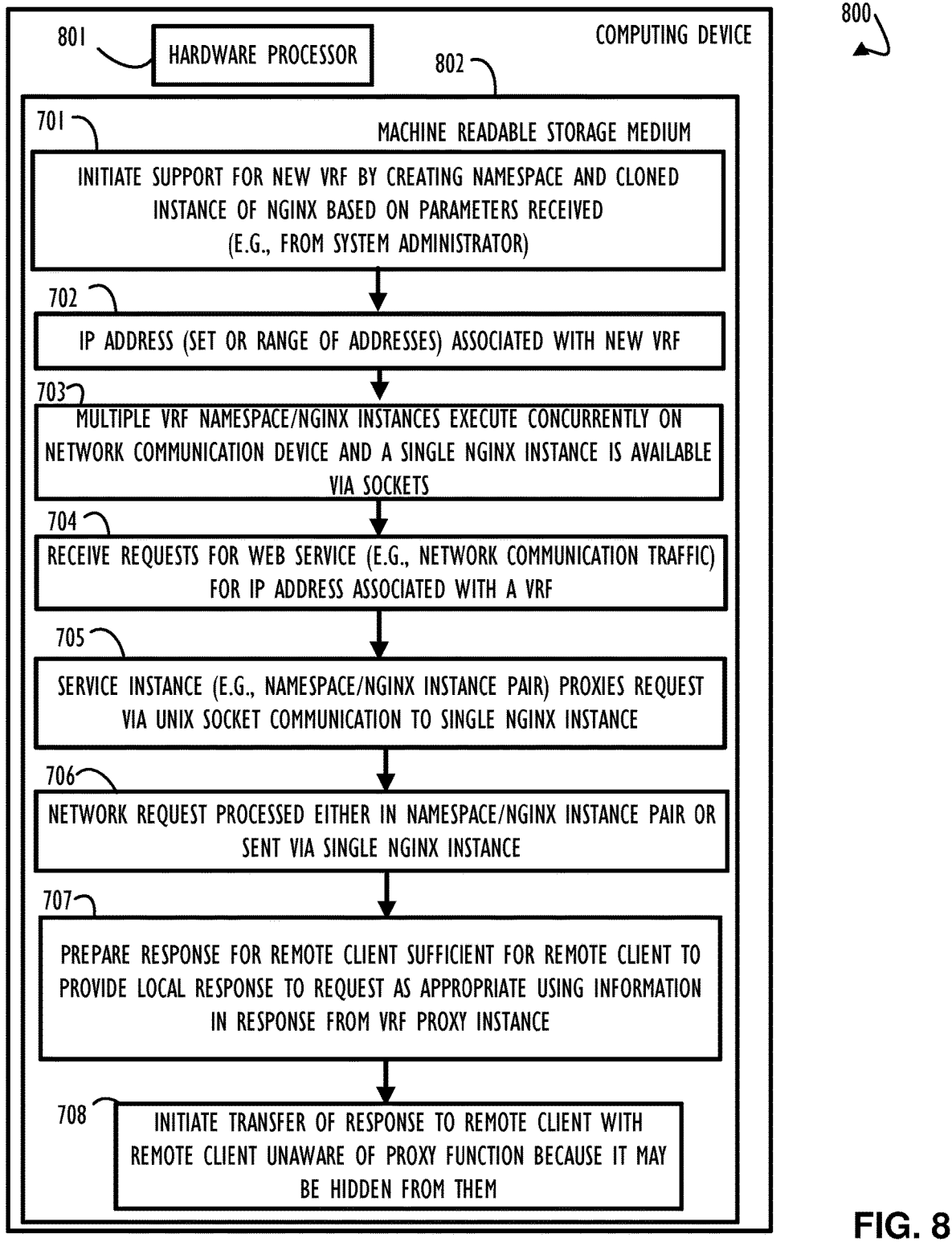
FIG. 8 is an example computing device with a hardware processor and accessible machine-readable instructions that might be used for performing VRF management techniques, according to one or more disclosed example implementations.

FIG. 8 is an example computing device 800, with a hardware processor 801, and accessible machine-readable instructions stored on a machine-readable medium 802 for performing VRF management techniques, according to one or more disclosed example implementations. FIG. 8 illustrates computing device 800 configured to perform the flow of method 700 as an example. However, computing device 800 may also be configured to perform the flow of other methods, techniques, functions, or processes described in this disclosure. In this example of FIG. 8, machine-readable storage medium 802 includes instructions to cause hardware processor 801 to perform blocks 701-708 discussed above with reference to FIG. 7.

A machine-readable storage medium, such as 802 of FIG. 8, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 9:
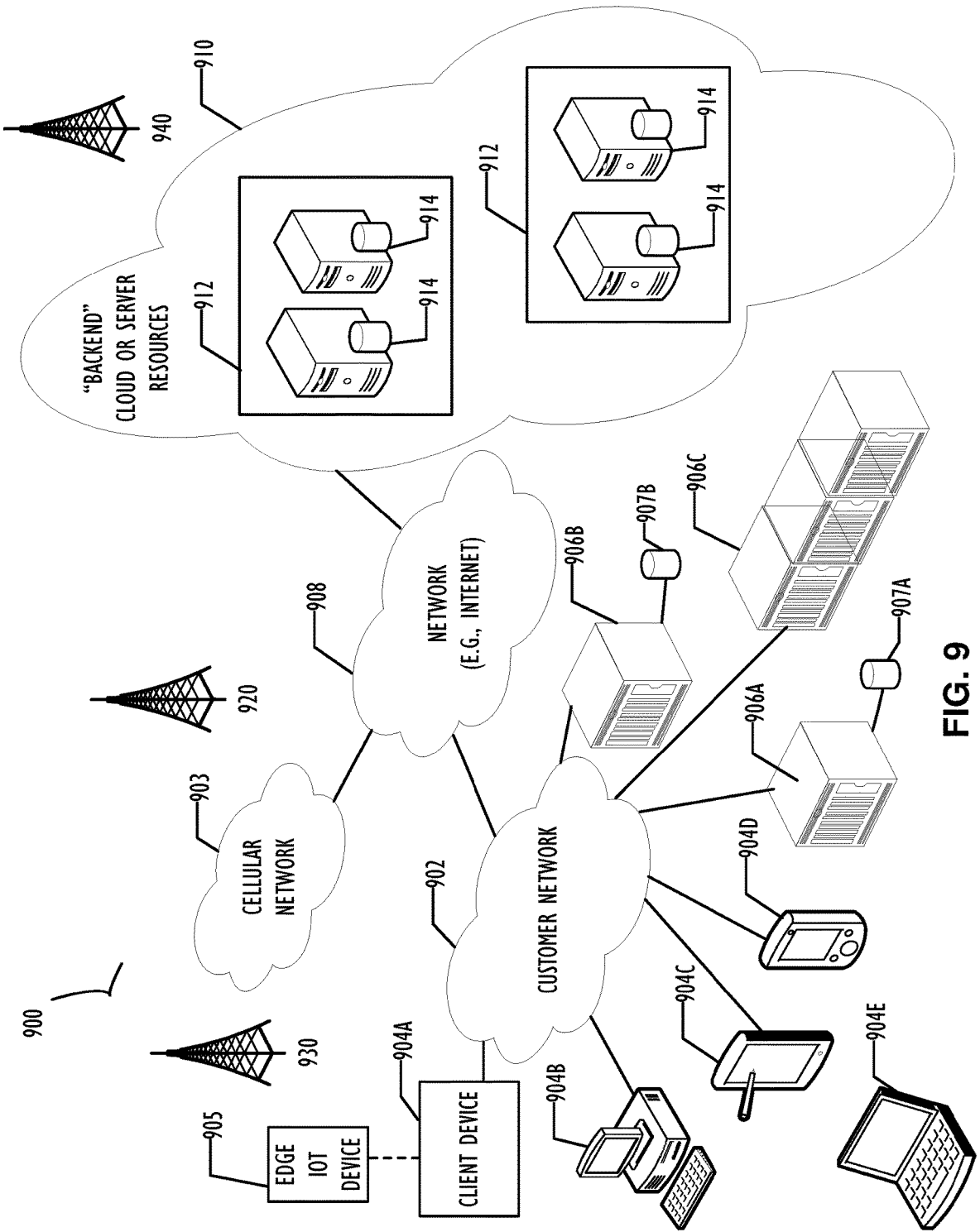
FIG. 9 represents a computer network infrastructure that may be used to implement all or part of the disclosed VRF management techniques, according to one or more disclosed implementations.
Figure 10:
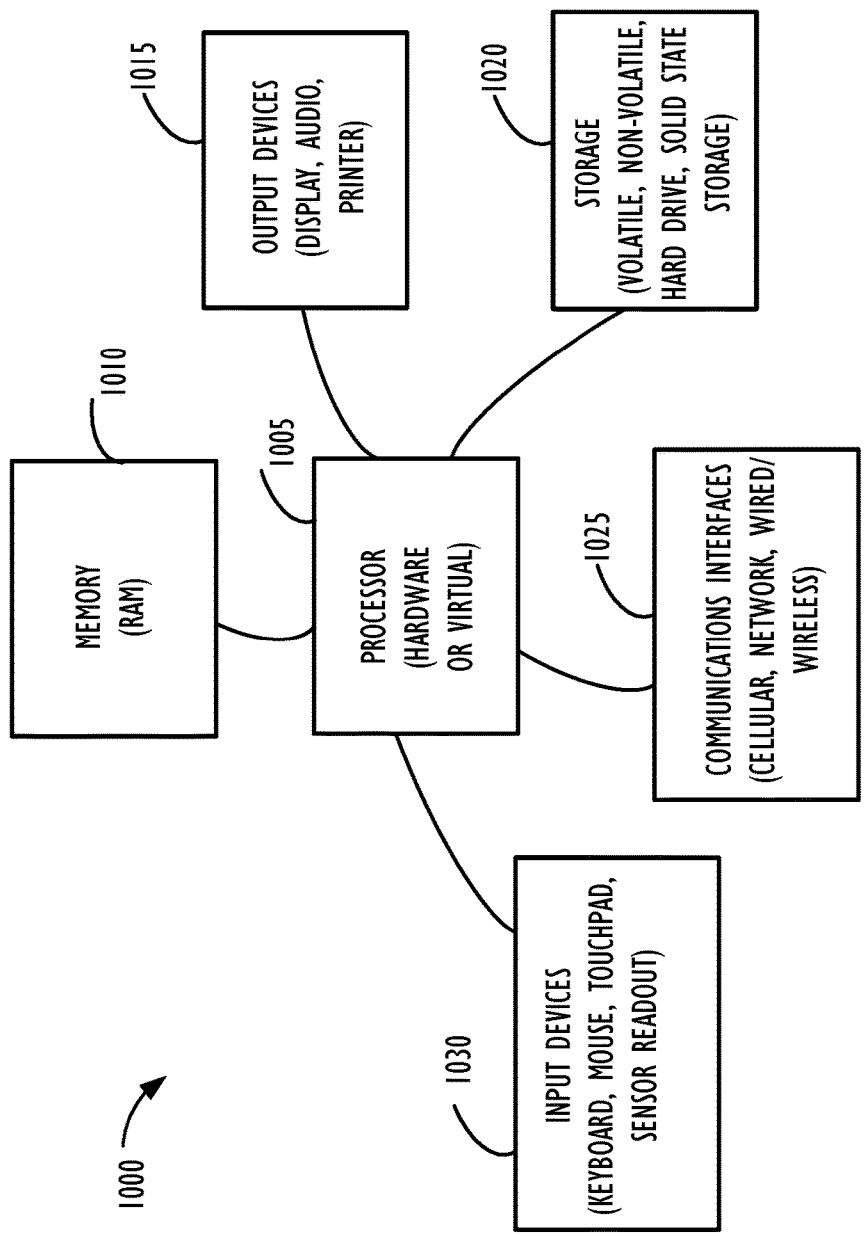
FIG. 10 illustrates a computer processing device that may be used to implement the functions, modules, processing platforms, execution platforms, communication devices, and other methods and processes of this disclosure.

FIG. 9 represents a computer network infrastructure that may be used to implement all or part of the disclosed VRF management techniques, according to one or more disclosed implementations. Network infrastructure 900 includes a set of networks where embodiments of the present disclosure may operate. Network infrastructure 900 comprises a customer network 902, network 908, cellular network 903, and a cloud service provider network 910. In one embodiment, the customer network 902 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 902 represents an enterprise network that could include or be communicatively coupled to one or more local area networks (LANs), virtual networks, data centers and/or other remote networks (e.g., 908, 910). In the context of the present disclosure, customer network 902 may include multiple devices configured with the disclosed event ingestion management techniques such as those described above. Also, one of the many computer storage resources in customer network 902 (or other networks shown) may be configured to store the historical event repository 350 of FIG. 3.

As shown in FIG. 9, customer network 902 may be connected to one or more client devices 904A-E and allow the client devices 904A-E to communicate with each other and/or with cloud service provider network 910, via network 908 (e.g., Internet). Client devices 904A-E may be computing systems such as desktop computer 904B, tablet computer 904C, mobile phone 904D, laptop computer (shown as wireless) 904E, and/or other types of computing systems generically shown as client device 904A.

Network infrastructure 900 may also include other types of devices generally referred to as Internet of Things (IoT) (e.g., edge IOT device 905) that may be configured to send and receive information via a network to access cloud computing services or interact with a remote web browser application (e.g., to receive configuration information).

FIG. 9 also illustrates that customer network 902 includes local compute resources 906A-C that may include a server, access point, router, or other device configured to provide for local computational resources and/or facilitate communication amongst networks and devices. For example, local compute resources 906A-C may be one or more physical local hardware devices, such as the different configurations of NN processing systems outlined above. Local compute resources 906A-C may also facilitate communication between other external applications, data sources (e.g., 907A and 907B), and services, and customer network 902. Local compute resource 906C illustrates a possible processing system cluster with three nodes. Of course, any number of nodes is possible, but three are shown in this example for illustrative purposes.

Network Infrastructure 900 also includes cellular network 903 for use with mobile communication devices. Mobile cellular networks support mobile phones and many other types of mobile devices such as laptops etc. Mobile devices in network infrastructure 900 are illustrated as mobile phone 904D, laptop computer 904E, and tablet computer 904C. A mobile device such as mobile phone 904D may interact with one or more mobile provider networks as the mobile device moves, typically interacting with a plurality of mobile network towers 920, 930, and 940 for connecting to the cellular network 903. In the context of the current monitoring and event ingestion management, user alerts as to initiating of throttling actions may be configured to provide an end-user notification. In some implementations, this notification may be provided through network infrastructure 900 directly to a system administrators cellular phone.

Although referred to as a cellular network in FIG. 9, a mobile device may interact with towers of more than one provider network, as well as with multiple non-cellular devices such as wireless access points and routers (e.g., local compute resources 906A-C). In addition, the mobile devices may interact with other mobile devices or with non-mobile devices such as desktop computer 904B and various types of client device 904A for desired services. Although not specifically illustrated in FIG. 9, customer network 902 may also include a dedicated network device (e.g., gateway or router) or a combination of network devices (not shown) that implement a customer firewall or intrusion protection system. These types of devices may be configured to provide an interface to an event management processing and throttling system of this disclosure.

FIG. 9 illustrates that customer network 902 is coupled to a network 908. Network 908 may include one or more computing networks available today, such as other LANs, wide area networks (WAN), the Internet, and/or other remote networks, in order to transfer data between client devices 904A-D and cloud service provider network 910. Each of the computing networks within network 908 may contain wired and/or wireless programmable devices that operate in the electrical and/or optical domain.

In FIG. 9, cloud service provider network 910 is illustrated as a remote network (e.g., a cloud network) that is able to communicate with client devices 904A-E via customer network 902 and network 908. The cloud service provider network 910 acts as a platform that provides additional computing resources to the client devices 904A-E and/or customer network 902. In one embodiment, cloud service provider network 910 includes one or more data centers 912 with one or more server instances 914.

FIG. 10 illustrates a computer processing device 1000 that may be used to implement the functions, modules, processing platforms, execution platforms, communication devices, and other methods and processes of this disclosure. For example, computing device 1000 illustrated in FIG. 10 could represent a client device or a physical server device and include either hardware or virtual processor(s) depending on the level of abstraction of the computing device. In some instances (without abstraction), computing device 1000 and its elements, as shown in FIG. 10, each relate to physical hardware. Alternatively, in some instances one, more, or all of the elements could be implemented using emulators or virtual machines as levels of abstraction. In any case, no matter how many levels of abstraction away from the physical hardware, computing device 1000 at its lowest level may be implemented on physical hardware.

As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display).

Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 10, computing device 1000 includes a processing element such as processor 1005 that contains one or more hardware processors, where each hardware processor may have a single or multiple processor cores. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 10, the processing elements that make up processor 1005 may also include one or more of other types of hardware processing components, such as graphics processing units (GPU), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more storage devices 1020 that comprise a non-volatile storage device and/or volatile memory. Volatile memory, such as random-access memory (RAM), can be any suitable non-permanent storage device. The non-volatile storage devices 1020 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage device 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1000 may comprise other components well known in the art, such as sensors, powers sources, and/or analog-to-digital converters, not explicitly shown in FIG. 10.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer readable medium comprising computer executable instructions stored thereon that when executed by one or more processing units, cause the one or more processing units to perform a method to proxy request for multiple virtual routing and forwarding (VRF) instances on a single network communication device, the method comprising:
instantiating a plurality of pairs of namespaces and instances of a Unix service, each of the plurality of pairs representing a proxy pair to support a single instance of a VRF, from a plurality of VRFs, on a network communication device;
receiving a network request from a client device, the network request associated with a network address mapped to a first VRF from the plurality of VRFs;
proxying the network request using a first proxy pair of namespace/service supporting the first VRF to a backend single instance of a proxy server, executing in an independent namespace associated with the backend single instance, using a local communication mechanism to communicate between the first proxy pair and the backend single instance;
providing the network request to a web service from the backend single instance of the proxy server on behalf of the first proxy pair;
receiving a command request on the network communication device to create a second VRF, the command request including at least one network address to associate with the second VRF;
instantiating a second proxy pair of namespace/service in addition to the plurality of pairs associated with the at least one network address, the second proxy pair to support the second VRF;
creating a copy of a service file used for creation of the Unix service uniquely associated with the first proxy pair; and
using the copy of the service file to perform the instantiating of the Unix service uniquely associated with the second proxy pair.

2. The non-transitory computer readable medium of claim 1, wherein the local communication mechanism is Unix sockets.

3. The non-transitory computer readable medium of claim 1, wherein the at least one network address comprises a set of internet protocol (IP) addresses.

4. The non-transitory computer readable medium of claim 1, wherein the at least one network address comprises an address range of internet protocol (IP) addresses.

5. The non-transitory computer readable medium of claim 1, wherein each of the plurality of VRFs supports one or more networks for the network communication device concurrently, each of the one or more networks having non-overlapping IP addresses.

6. A network communication device, comprising:
one or more processing units having multiple cores;
a first memory storing a local database representing state information about the network communication device; and
a second memory storing instructions, that when executed by the one or more processing units, cause the one or more processing units to provide a method to proxy request for multiple virtual routing and forwarding (VRF) instances on a single network communication device, the method comprising:
instantiating a plurality of pairs of namespaces and instances of a Unix service, each of the plurality of pairs representing a proxy pair to support a single instance of a VRF, from a plurality of VRFs, on the network communication device;
receiving a network request from a client device, the network request associated with a network address mapped to a first VRF from the plurality of VRFs;
proxying the network request using a first proxy pair of namespace/service supporting the first VRF to a backend single instance of a proxy server, executing in an independent namespace associated with the backend single instance, using a local communication mechanism to communicate between the first proxy pair and the backend single instance;
providing the network request to a web service from the backend single instance of the proxy server on behalf of the first proxy pair;
receiving a command request on the network communication device to create a second VRF, the command request including at least one network address to associate with the second VRF;
instantiating a second proxy pair of namespace/service in addition to the plurality of pairs associated with the at least one network address, the second proxy pair to support the second VRF;
creating a copy of a service file used for creation of the Unix service uniquely associated with the first proxy pair; and
using the copy of the service file to perform the instantiating of the Unix service uniquely associated with the second proxy pair.

7. The network communication device of claim 6, wherein the local communication mechanism is Unix sockets.

8. The network communication device of claim 6, wherein the at least one network address comprises a set of internet protocol (IP) addresses.

9. The network communication device of claim 6, wherein the at least one network address comprises an address range of internet protocol (IP) addresses.

10. The network communication device of claim 6, wherein each of the plurality of VRFs supports one or more networks for the network communication device concurrently, each of the one or more networks having non-overlapping IP addresses.

11. A computer implemented method to proxy request for multiple virtual routing and forwarding (VRF) instances on a single network communication device, the method comprising:
instantiating a plurality of pairs of namespaces and instances of a Unix service, each of the plurality of pairs representing a proxy pair to support a single instance of a VRF, from a plurality of VRFs, on a network communication device;
receiving a network request from a client device, the network request associated with a network address mapped to a first VRF from the plurality of VRFs;

proxying the network request using a first proxy pair of namespace/service supporting the first VRF to a backend single instance of a proxy server, executing in an independent namespace associated with the backend single instance, using a local communication mechanism to communicate between the first proxy pair and the backend single instance;

providing the network request to a web service from the backend single instance of the proxy server on behalf of the first proxy pair; and receiving a command request on the network communication device to create a second VRF, the command request including at least one network address to associate with the second VRF;

instantiating a second proxy pair of namespace/service in addition to the plurality of pairs associated with the at least one network address, the second proxy pair to support the second VRF;

creating a copy of a service file used for creation of the Unix service uniquely associated with the first proxy pair; and using the copy of the service file to perform the instantiating of the Unix service uniquely associated with the second proxy pair.

12. The computer implemented method of claim 11, wherein the local communication mechanism is Unix sockets.

13. The computer implemented method of claim 11, wherein the at least one network address comprises a set of internet protocol (IP) addresses.

14. The computer implemented method of claim 11, wherein each of the plurality of VRFs supports one or more networks for the network communication device concurrently, each of the one or more networks having non-overlapping IP addresses.

* * * * *